(12) United States Patent
Neushul

(10) Patent No.: US 7,808,688 B2
(45) Date of Patent: Oct. 5, 2010

(54) APPARATUS AND METHOD OF CAPTURING IMAGES FROM ALTERNATIVE MEDIA TYPES

(76) Inventor: Stephen Neushul, 106 S. Helberta Ave., Redondo Beach, CA (US) 90220

( * ) Notice: Subject to any disclaimer, the term of this patent is extended or adjusted under 35 U.S.C. 154(b) by 0 days.

(21) Appl. No.: 10/386,326

(22) Filed: Mar. 10, 2003

(65) Prior Publication Data

US 2003/0169471 A1    Sep. 11, 2003

Related U.S. Application Data

(60) Division of application No. 09/747,616, filed on Dec. 20, 2000, now Pat. No. 6,532,092, which is a continuation of application No. 09/450,031, filed on Nov. 24, 1999, now Pat. No. 6,188,501.

(51) Int. Cl.
*G02B 26/08* (2006.01)

(52) U.S. Cl. .............. 359/196.1; 359/209.1; 359/212.1; 359/900; 358/483; 358/494

(58) Field of Classification Search ......... 359/196–226; 250/234–236; 358/474, 475, 483, 487, 494, 358/496, 497, 296
See application file for complete search history.

(56) References Cited

U.S. PATENT DOCUMENTS

| | | | |
|---|---|---|---|
| 1,431,271 A | 10/1922 | Van Allen | |
| 3,694,653 A | 9/1972 | Allard et al. | |
| 3,896,576 A | 7/1975 | Wolf et al. | |
| 4,628,356 A | 12/1986 | Spillman et al. | |
| 4,870,285 A | 9/1989 | Ohgoda | |
| 4,879,604 A | 11/1989 | Koshiyouji | |
| 4,908,876 A | 3/1990 | DeForest et al. | |
| 4,931,641 A | 6/1990 | Ohgoda | |
| 4,996,785 A | 3/1991 | Cicenas | |
| 5,025,157 A | 6/1991 | Katsuaki | |
| 5,038,227 A | 8/1991 | Koshiyouji et al. | |
| 5,068,909 A | 11/1991 | Rutherford et al. | |
| 5,241,406 A | 8/1993 | Johnston et al. | |

(Continued)

FOREIGN PATENT DOCUMENTS

EP     0 162 528     11/1985

(Continued)

OTHER PUBLICATIONS

A. Allam, *Letter to the Editor: Low Cost Autonomous System of Image Acquisition and Processing Using a Linear CCD Camera*, L'Onde Electrique, vol. 74 No. 2, Mar./Apr. 1992, pp. 54-56.

(Continued)

*Primary Examiner*—James Phan
(74) *Attorney, Agent, or Firm*—Blakely, Sokoloff, Taylor & Zafman, LLP

(57) ABSTRACT

A method and apparatus to permit digital capture of images from both transmissive and reflective media. A laser or other source of excitation radiation is coupled to a mounting surface to be in optical communication with a reading window when installed on a scanner. A rear casing is coupled to the monitoring surface to engage a housing of a scanner, the housing defining the reading window.

12 Claims, 4 Drawing Sheets

U.S. PATENT DOCUMENTS

| | | | |
|---|---|---|---|
| 5,245,539 | A | 9/1993 | Romeas et al. |
| 5,251,072 | A | 10/1993 | Fukuoka et al. |
| 5,308,994 | A | 5/1994 | Ohta et al. |
| 5,321,520 | A | 6/1994 | Inga et al. |
| 5,340,995 | A | 8/1994 | Verbeke et al. |
| 5,384,862 | A | 1/1995 | Echerer et al. |
| 5,441,251 | A | 8/1995 | Ohta |
| 5,574,274 | A * | 11/1996 | Rubley et al. ............ 250/208.1 |
| 5,814,809 | A | 9/1998 | Han |
| 5,861,631 | A | 1/1999 | Wendlandt et al. |
| 6,068,439 | A | 5/2000 | Ohta |
| 6,233,065 | B1 | 5/2001 | Lee |
| 2004/0124368 | A1 | 7/2004 | Struye et al. |

FOREIGN PATENT DOCUMENTS

| | | |
|---|---|---|
| EP | 0601355 | 6/1994 |

OTHER PUBLICATIONS

A. Allam, *Lettre a l'editeur: Systeme d'acquisition et de traitement d'image autonome a faible cout par camera lineaire CCD*, L'Onde Electrique, vol. 74 No. 2, Mar./Apr. 1992 pp. 54-56.

Patent Abstracts of Japan, vol. 014, No. 161 (E-0909), Mar. 28, 1990, & JP-A-02 016863 (Minolta Camera Co. Ltd.), Jan. 19, 1990 Abstract.

*Max Vision—The Magic of Color, UC1260 Color Scanner, UMAX$_i$®*, Image & O.A., Feb. 1993.

*COBRASCAN™, CX-300*, Radiographic Digital Imaging, 1994.

Office Action dated Feb. 20, 2008 regarding European Patent Application No. 00991444.1, filed Oct. 20, 2000, entitled, "An Apparatus and Method of Capturing Images,", 7 pgs.

* cited by examiner

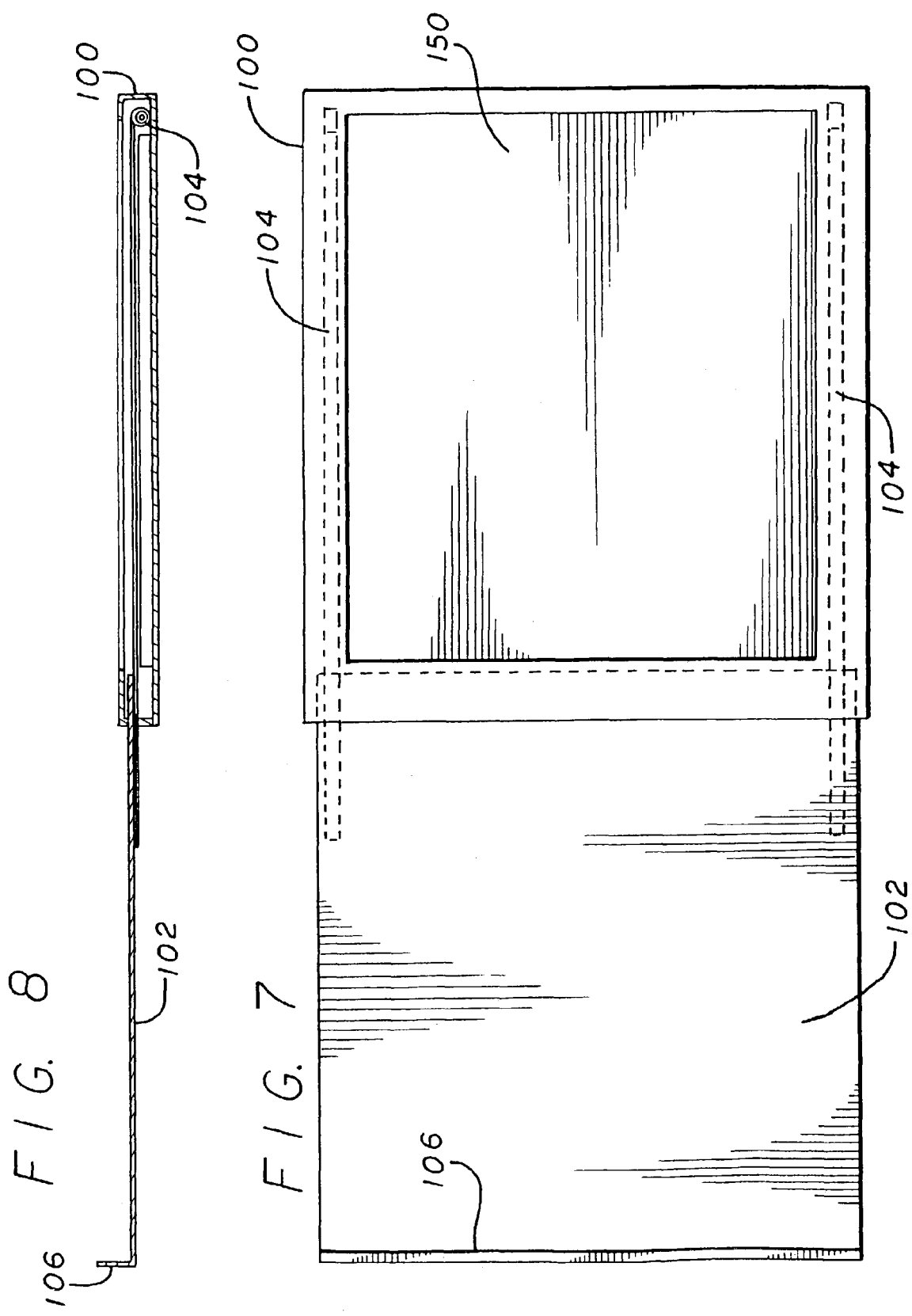

APPARATUS AND METHOD OF CAPTURING IMAGES FROM ALTERNATIVE MEDIA TYPES

BACKGROUND

This is a Divisional of Ser. No. 09/747,616, filed Dec. 20, 2000 now U.S. Pat. No. 6,532,092, which is a Continuation of Ser. No. 09/450,031, filed Nov. 24, 1999 now U.S. Pat. No. 6,188,501, entitled, AN APPARATUS AND METHOD OF CAPTURING IMAGES FROM ALTERNATIVE MEDIA TYPES.

FIELD OF THE INVENTION

The invention relates to digital capture of x-ray images. More specifically, the invention relates to capturing of x-ray images from both transmissive film and reflective filmless plates.

BACKGROUND

Various scanners for digitizing images from x-ray film are commercially available. For example, Radiographic Digital Imaging of Compton, Calif. produces a lightbox scanner sold under the trademark COBRASCAN® which uses a charge coupled device (CCD) to capture the image contained on a standard x-ray film when the x-ray film is transported past a reading window.

While traditional x-ray film has been ubiquitous for decades, more recently, filmless x-rays have been taken using a phosphorescent plate. The phosphorescent plate is reflective and erasable, allowing for repeated reuse. An x-ray impregnates the plate with energy which, when subsequently exposed to a particular excitation, is released, recreating the image. Various companies produce readers for these filmless plates, including Fuji Film Ltd. and Eastman Kodak. Such readers typically employ a flying spot laser and photo multiplier tube. The photo multiplier tube captures the image corresponding to the energy being released by excitation of the flying spot laser. The plate is typically transported by a set of rollers which necessitate that the phosphorescent plate be flexible and, in any case, over time, causes a deleterious effect on the plate, resulting in limited reusability. Additionally, these readers are incapable of digitizing conventional x-ray film. Thus, a radiology department is required to have two separate devices for the digitization of images from the different media types.

BRIEF SUMMARY OF THE INVENTION

A method and apparatus to permit digital capture of images from both transmissive and reflective media is disclosed. A laser or other source of excitation radiation is coupled to a mounting surface to be in optical communication with a reading window when installed on a scanner. A rear casing is coupled to the mounting surface to engage a housing of a scanner, the housing defining the reading window.

BRIEF DESCRIPTION OF THE DRAWINGS

FIGS. 7 and 8 show a filmless x-ray cassette which may be used with one embodiment of the invention.

DETAILED DESCRIPTION

Figure 1:
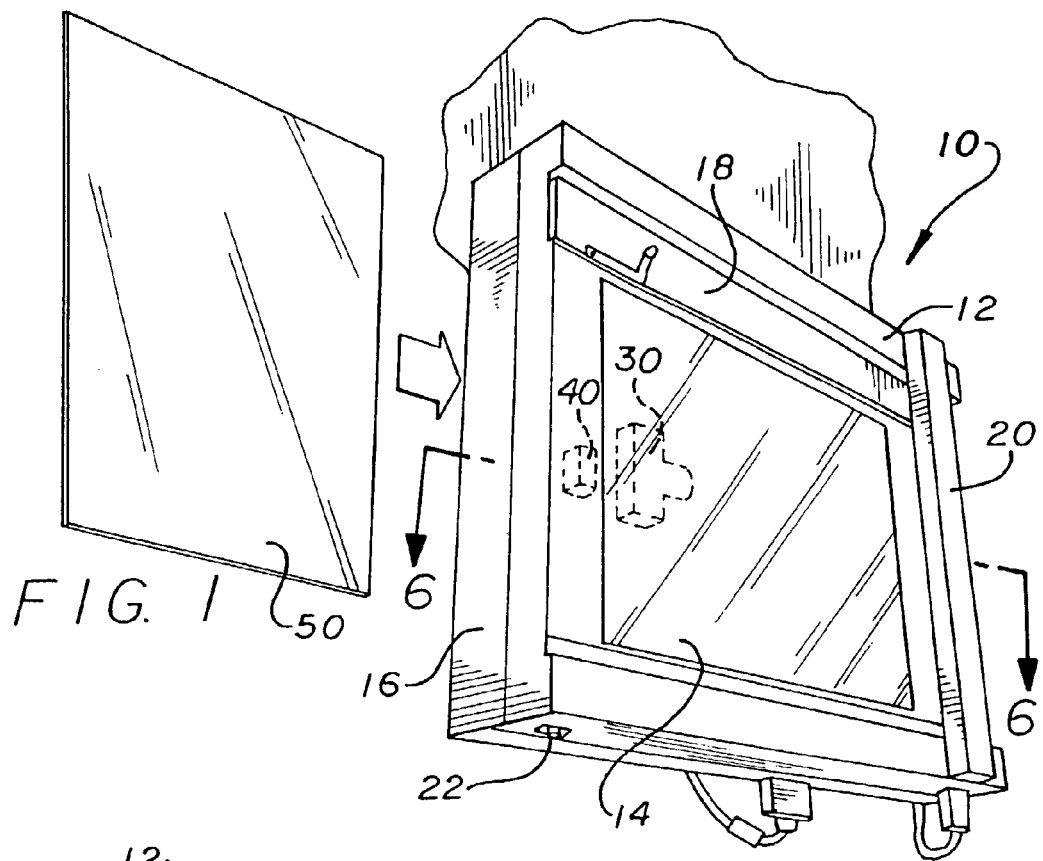
FIG. 1 is a diagram of the image capture device of one embodiment of the invention.

FIG. 1 is a diagram of the image capture device of one embodiment of the invention. Lightbox and dual scanner unit 10 includes a housing 12 that defines a translucent viewing surface 14 and a reading window (not shown). The unit 10 is mounted vertically such that reading of media occurs in a vertical plane. This vertical mounting also reduces the likelihood of dust contamination on the internal optics of the unit 10. In one embodiment, the viewing surface is illuminated from within by a pair of fluorescent tubes mounted within the housing 12. In an alternative embodiment, camera 30 is replaced with a photo multiplier tube (PMT). In such embodiment, an optical wave guide may be used between the PMT and the reading window. ISAs and PMT are generically referred to as "sensors" herein. A digital camera 30 which includes an image sensing array (ISA), such as a charge coupled device (CCD) or a complementary metal oxide semiconductor (CMOS) device is disposed within the housing 12. A digital back 16 contains a laser 40 that is described in further detail below. Switch 22 may be a multi-positional switch which selects a mode of operation, including lightbox only, transmissive scan, or reflective scan. Alternatively, switch 22 may merely turn the power to the system on, while mode selection is software driven or provided by another switch, button or keypad.

A bar clip 18 is used to hold a medium to be scanned. In this instance, the medium may be a transmissive traditional x-ray film, or a reflective phosphorescent plate. It is desirable that the bar clip be offset from viewing window 14 such that media hanging in the bar clip is not in surface contact with the window. This avoids frictional degradation of the film or plate. Lightcover 20 covers a vertically mounted fluorescent tube which provides the backlight source for scanning transmissive media. This backlight source is disposed a displacement from the reading window (not shown) such that when a transmissive medium is transported by the transport mechanism past the reading window, the light source shines through the transmissive media permitting the sensor to scan the image line by line. The transport mechanism in one embodiment of the invention includes a stepper motor and a rack-and-pinion drive which drives at the bar clip during scanning.

Figure 2:
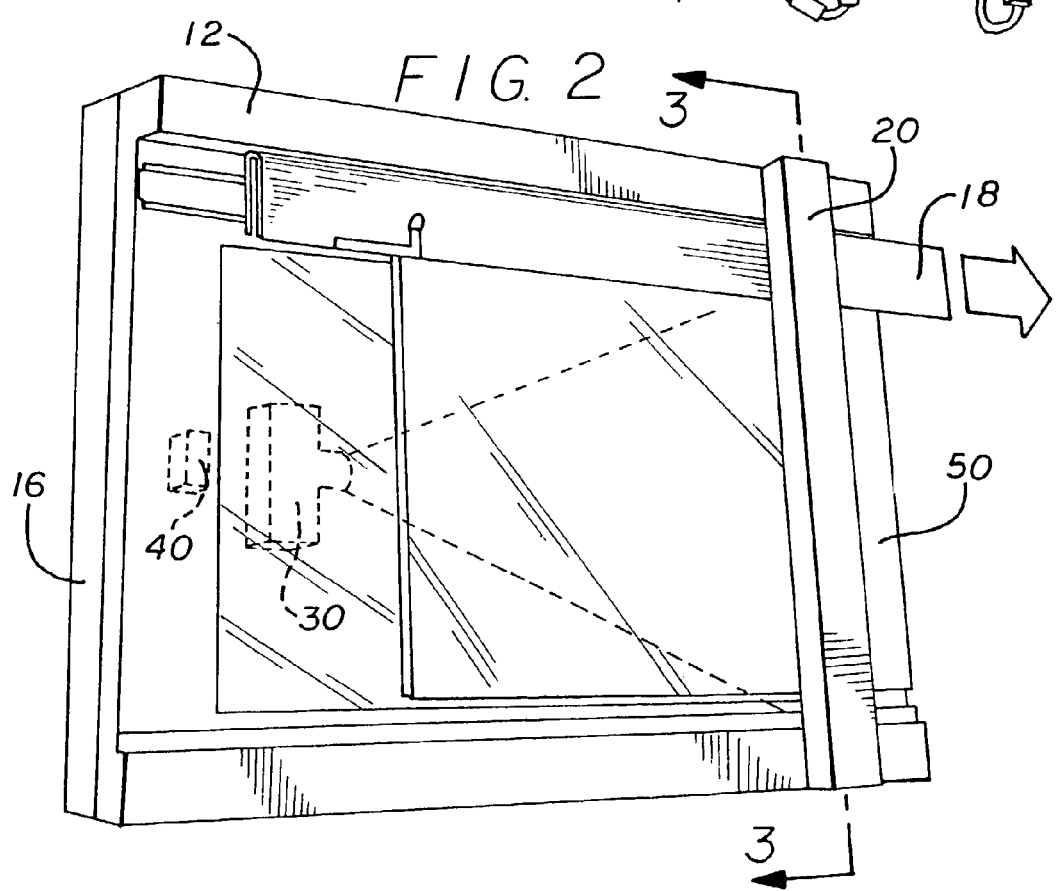
FIG. 2 is a diagram of the image capture system of FIG. 1 transporting a medium.

FIG. 2 is a diagram of the image capture system of FIG. 1 transporting a medium. The media 50 is retained in bar clip 18 and transported under the scanning light source past the reading window. In the shown embodiment during scanning, the bar clip will transport the media from left to right between the reading window and the backlighting source and then return the media to be disposed over the viewing surface 14.

Figure 3:
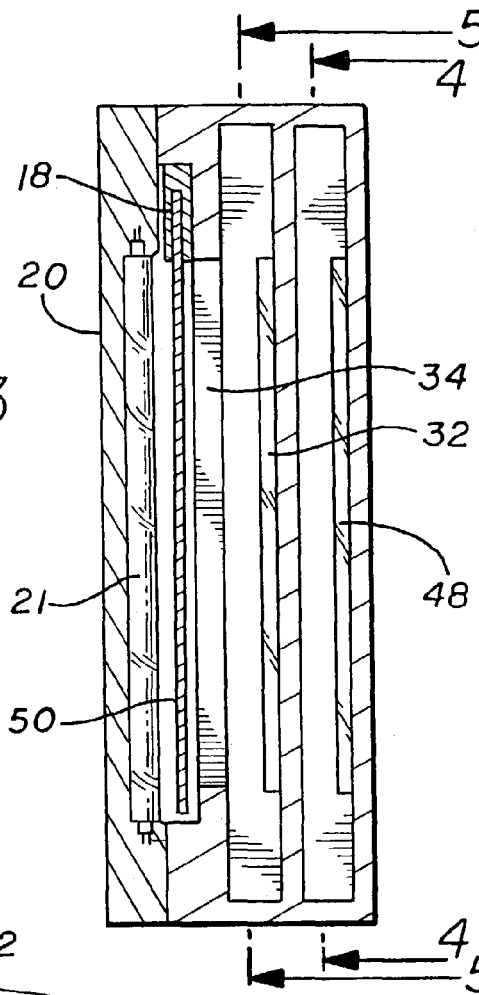
FIG. 3 is a cross-sectional view of a scanning system of one embodiment of the invention.

FIG. 3 is a cross-sectional view of a scanning system of one embodiment of the invention. The backlight 21 for reading of transmissive media is revealed in this cross-sectional view. Backlight 21 is mounted vertically under lightcover 20 a displacement from reading window 34 which permits the transport mechanism 18 to transport media 50 between the reading window 34 and the light 21. Reading mirror 32 and the laser redirection mirror 48 are also shown.

Figure 4:
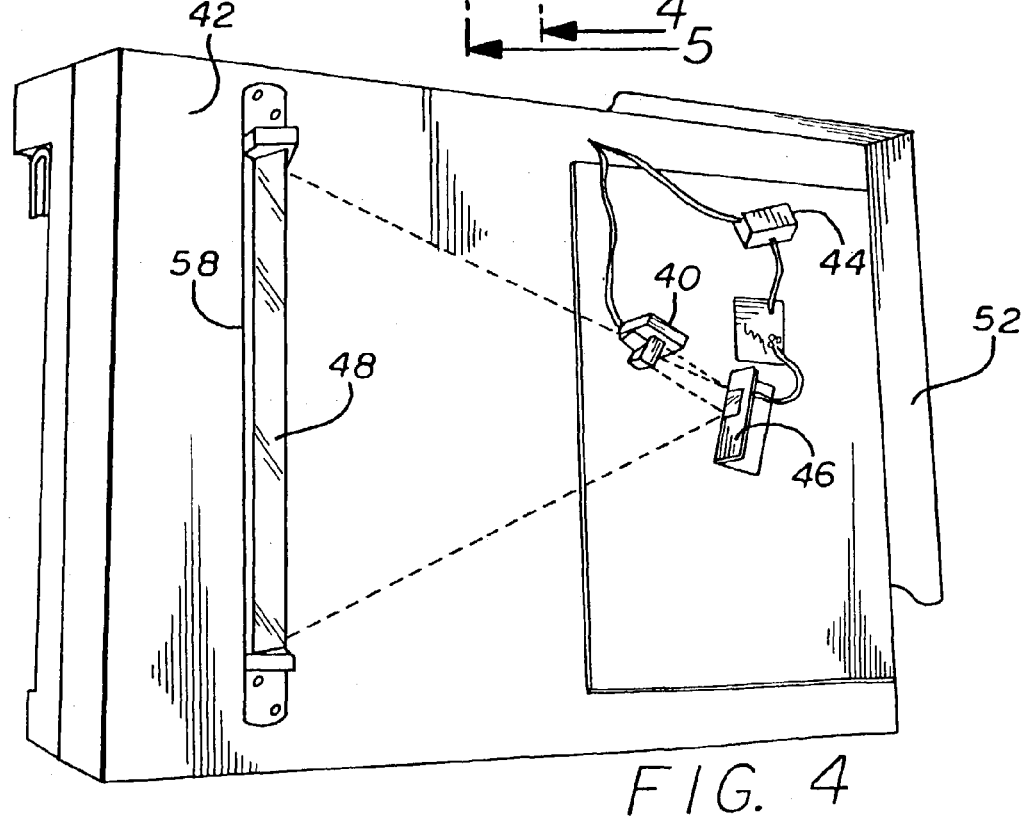
FIG. 4 is a cutaway view showing the digital back of one embodiment of the invention.

FIG. 4 is a cutaway view showing the digital back of one embodiment of the invention. A mounting surface 42 is coupled to a rear casing 52. A laser 40 is mounted on the mounting surface 42. The mounting surface 42 defines a optically transmissive window 58 which permits the laser 40 to be in optical communication with a reading window. A mirror 48 is mounted on the mounting surface 42 and reflects the laser light incident thereon through the optically transmissive window 58 and on through the reading window (not shown).

Because of the energy density required to excite typical existing phosphorescent plates to release the image stored thereon, the number of options for laser 40 are possible. One option is to have the laser be a twenty watt laser. With a twenty watt laser, using a simple mask, a line of laser light can be created and reflected by mirror 48 to excite the plate directly. In one embodiment, the line created has a width of fifty microns. Embodiments using a twenty watt laser tend to be quite expensive. Alternatively, a scan pattern may be created by a scan pattern creator 46. The scan pattern should be created at a speed much faster than the response time of the ISA such that the ISA "sees" the scan pattern as a unit. In such embodiment, laser 40 may be a continuous spot laser and the scan pattern creator 46 may be a piezo electric mirror or a rotating prism driven by motor 44. In this manner of relatively low wattage, continuous spot lasers can be used to create a line by rotating the mirror or prism back and forth rapidly at a rate higher than the response rate of the ISA, thereby exciting a continuous line on the phosphorescent plate and allowing line-by-line capture of the image by the ISA.

For example, laser 40 may be a diode laser at a 680 nm wavelength with a spot size of fifty microns. The pattern generated for excitation of lines of a typical phosphorescent plate is a fourteen inch line with a power density of ten mW/spot. This then dictates the wattage of the laser and the rate of rotation of the scan pattern generator. In some embodiments, such as those using PMT, laser 40 may be a flying spot laser.

Figure 5:
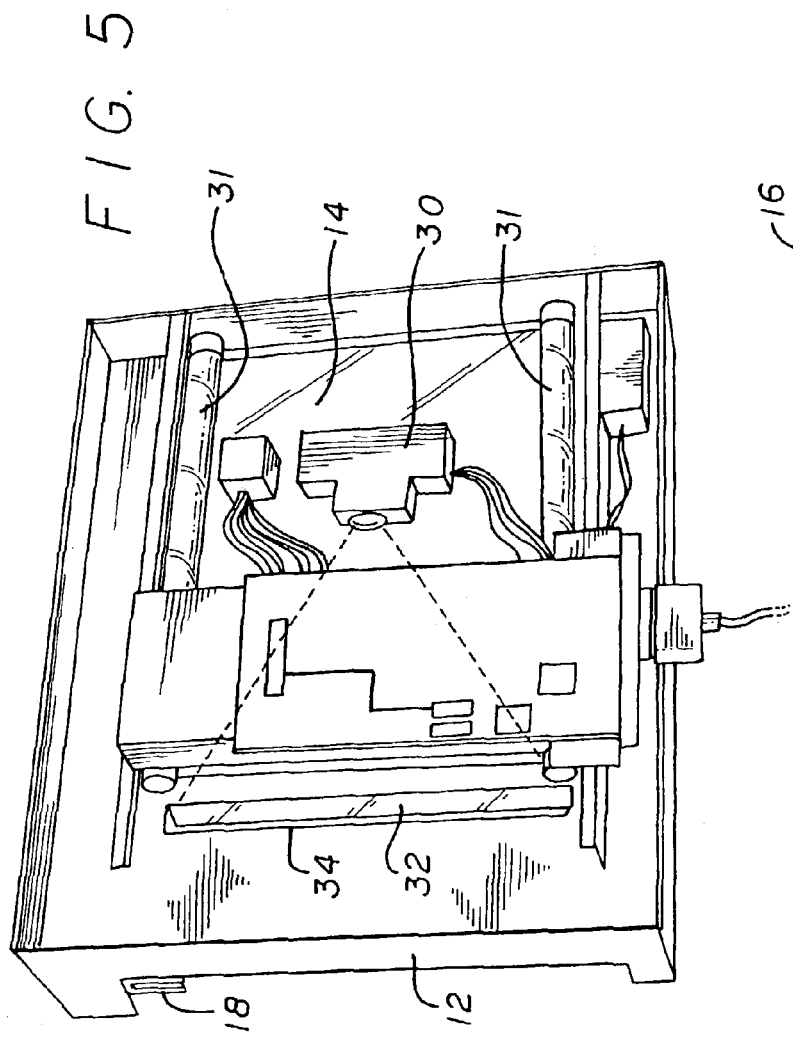
FIG. 5 is a sectional view showing an image capture camera which captures an image reflected by a mirror from a reading window.

FIG. 5 is a sectional view showing image capture camera 30 which captures an image reflected by reading mirror 32 from reading window 34. A pair of horizontally mounted fluorescent tubes 31 illuminates viewing surface 14 from within the housing 12. As previously noted, all of these components are mounted within housing 12. The reading mirror 34 ensures optical communication between the camera 30 and any media passing over a reading window.

Figure 6:
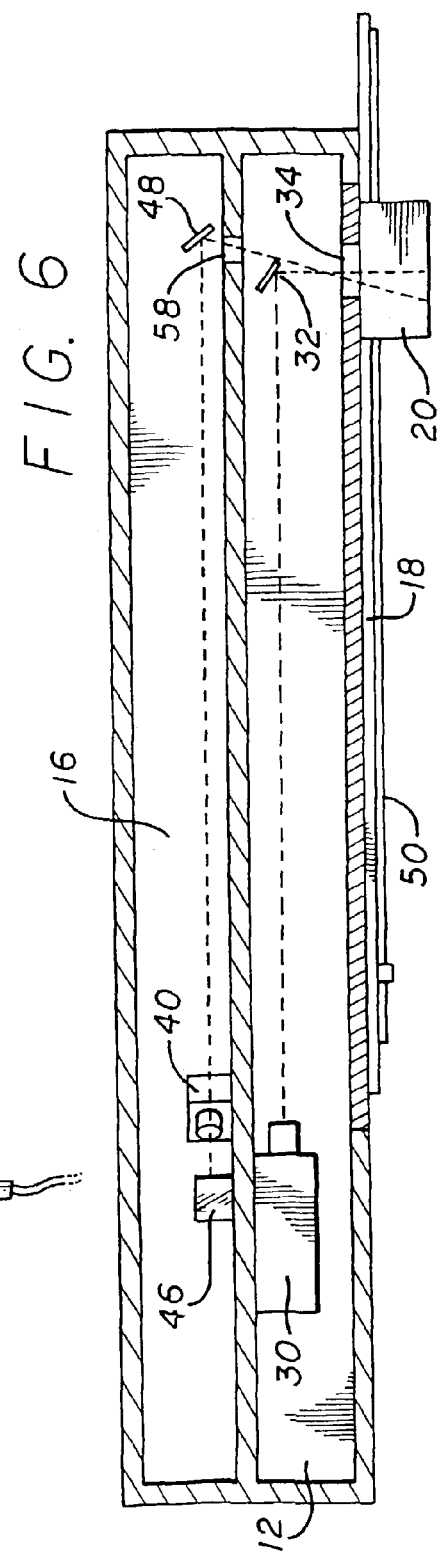
FIG. 6 is a top plan cross-sectional view of a system of one embodiment of the invention.

FIG. 6 is a top plan cross-sectional view of a system of one embodiment of the invention. Digital back 16 couples to housing 12 to form an enclosure that prevents contaminants from entering. In one embodiment, the digital back is desired to provide an easy retrofit for existing COBRASCAN® scanners.

The laser 40 focuses its beam on scan pattern creator 46 which directs the pattern created, which in one embodiment is a line, onto mirror 48. Mirror 48 is at an angle to the pattern creator 46 such that the created line of laser light is directed by mirror 48 at an angle past reading mirror 32 through reading window 34. Reading mirror 32 is positioned at a 45° degree angle to both camera 30 and reading window 34 such that it reflects a line of the image just beyond the exposure to laser light. In this manner, if the medium transported is a phosphorescent plate, released energy signature corresponding to an image is stored by the camera 30. If the medium is an x-ray film or other transmissive medium, it is backlit by the light source in light source cover 20 and that image is captured by camera 30. Notably, if the medium is transmissive, the line of laser light will pass through and the coefficient of reflection is such that it will not be reflected to the mirror 32 and captured by the camera 30. Accordingly, operating the laser while scanning transmissive media results in no significant degradation of the images captured. Thus, in one embodiment of the invention, media images are simultaneously backlit and exposed to laser light. In such cases, the system need not know what mode it is operating in. The sensor merely captures the image reflected by reading mirror 32 without regard to whether the media is transmissive or reflective.

FIGS. 7 and 8 show a filmless x-ray cassette which may be used with one embodiment of the invention. The cassette includes a casing 100 having a cover 102 which slidably engages the casing 100 and is held by a pair of continuous springs 104 such that it is exposed when the cover is open. The cover is provided with a lip 106. When the cassette is held by the bar clip of one embodiment of the invention, the lip 106 hooks over the left end of the housing. Then as the cassette is transported in front of the viewing window, the cover slides off by virtue of the action of the transport mechanism and having the lip hooked on the left edge of the housing, thereby exposing the phosphorescent plate 150 inside. As the transport mechanism returns to its pre-scan position, the continuous springs pull the cover into a retracted position. In this manner, the contact with the phosphorescent plate is minimized such that the useful life is vastly increased.

In one embodiment, the light source for the viewing surface is selected to have a wavelength that causes the plate to be erased. In such an embodiment, if the continuous springs are omitted, the plate will be scanned and erased in a single cycle. In such an embodiment, the cassette is opened by the action of the transport mechanism but requires manual closing after erasure in the return position. Notably, no contact with the plate is required even in this embodiment.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   selecting between a transmissive scan mode (TSM) and a reflective scan mode (RSM);
   backlighting a transmissive medium if TSM is selected; and
   generating a scan pattern if RSM is selected.

2. The method of claim 1 further comprising:
   capturing an image generated by a release of energy responsive to an excitation radiation if the medium is reflective; and
   capturing an image exposed by the backlighting if the medium is transmissive.

3. The method of claim 2 wherein the reflecting causes the scan pattern to excite a reflective media along a line, a plane through which an intersecting a middle line of a reading mirror, defines an angle greater than 45° with a surface plane of the reading mirror.

4. The method of claim 2 further comprising:
   exposing the medium to radiation suitable to erase a phosphorescent plate after the capturing.

5. The method of claim 2 further comprising:
   automatically erasing the reflective media without removing the media from a capture unit.

6. The method of claim 2 wherein capturing comprises:
translating the medium past a capture window; and
returning the medium to a start position, the translating and returning being a cycle.

7. The method of claim 6 further comprising:
exposing the medium to erasing radiation in a same cycle as the capturing.

8. The method of claim 1 further comprising:
capturing an image exposed by the backlighting if the medium is transmissive.

9. A method comprising:
selecting between a transmissive scan mode (TSM) and a reflective scan mode (RSM);
generating a scan pattern if RSM is selected;
activating a laser to produce a laser beam of a first energy density; and
interposing optics between the laser and a reflective media to create a light line of a second energy density, wherein the second energy density is sufficient to excite a phosphorescent plate.

10. The method of claim 9 further comprising:
capturing an image represented by an energy release of the phosphorescent plate in an image sensing array.

11. The method of claim 10 further comprising:
storing a digital representation of the image.

12. The method of claim 10 further comprising:
automatically erasing the phosphorescent plate once the capturing is complete.

* * * * *